United States Patent [19]
May

[11] Patent Number: 5,589,968
[45] Date of Patent: Dec. 31, 1996

[54] MODE-LOCKED DIODE LASER BASED OPTICAL COMMUNICATION SYSTEM

[75] Inventor: Paul May, Abingdon, United Kingdom

[73] Assignee: Sharp Kabushiki Kaisha, Osaka, Japan

[21] Appl. No.: 380,248

[22] Filed: Jan. 27, 1995

Related U.S. Application Data

[63] Continuation of Ser. No. 947,122, Sep. 17, 1992, abandoned.

[30] Foreign Application Priority Data

Sep. 20, 1991 [GB] United Kingdom ............... 9120117

[51] Int. Cl.⁶ .................... H04J 14/02; H04B 10/04
[52] U.S. Cl. .................. 359/124; 359/133; 359/180
[58] Field of Search ........................ 372/18, 19, 43, 372/72, 97, 22, 23, 28, 44; 359/181, 182, 183, 184, 185, 186, 187, 188, 124, 133, 180; 375/260

[56] References Cited

U.S. PATENT DOCUMENTS

| | | | |
|---|---|---|---|
| 3,986,020 | 10/1976 | Kogelnik | 250/199 |
| 4,386,428 | 5/1983 | Bauer | 372/41 |
| 4,425,652 | 1/1984 | Mourou | 372/69 |
| 4,579,417 | 4/1986 | Ih | 359/127 |

(List continued on next page.)

FOREIGN PATENT DOCUMENTS

| | | | |
|---|---|---|---|
| 0084462 | 7/1983 | European Pat. Off. | |
| 0444348A2 | 9/1991 | European Pat. Off. | |
| 0450557 | 10/1991 | European Pat. Off. | |
| A0206245 | 12/1983 | Japan | 359/124 |
| 405206987 | 8/1993 | Japan | 359/124 |
| 1107863 | 3/1968 | United Kingdom | |
| 1203160 | 8/1970 | United Kingdom | |
| 1226162 | 3/1971 | United Kingdom | |
| 1242890 | 8/1971 | United Kingdom | |
| 1543405 | 4/1979 | United Kingdom | |
| 2093318 | 8/1982 | United Kingdom | |
| 2184596 | 6/1987 | United Kingdom | |

OTHER PUBLICATIONS

Wu et al, IEDM 90, IEEE, pp. 137–139, "Sub-Picosecond Optical Pulse Generation at 350 GHz in Monolithic Passive CPM MQW Lasers".

Morton et al, Appl. Phys. Lett. 56(2), Jan. 8, 1990; pp. 111–113, "Monolithic Hybrid Mode-Locked 1.3 mm Semiconductor Lasers".

Wu et al, Appl. Phys. Lett. 57(8), Aug. 20, 1990, pp. 759–761, "Transform-Limited 1.4 ps Optical Pulses from a Monolithic Colliding-Pulse Mode-Locked Quantum Well Laser".

First Partial U.K. Search Report dated Jul. 3, 1992 for corresponding U.K. Application 9120117.8.

Second Partial U.K. Search Report dated Jul. 3, 1992 for corresponding U.K. Application 9120117.8.

Third Partial U.K. Search Report dated Jul. 3, 1992 for corresponding U.K. Application 9120117.8.

U.K. Search Report dated Apr. 16, 1992 for corresponding U.K. Application 9120117.8.

J. P. Harbison et al., "Vertical-Cavity Surface-Emitting Lasers: MBE Growth and Optical Information Processing Applications", Materials Research Society Symp. Proc. vol. 228, pp. 177–186, May 1991.

"Monolithic Multiple Wavelength Tunable Vertical Cavity Surface Emitting Laser Array" by C. J. Chang-Hasnain, M. W. Maeda, J. P. Harbison and L. T. Florez; Joint Soviet-American Workshop on the Physics of Semiconductor Lasers, May 20–Jun. 3, 1991.

*Primary Examiner*—Hezron E. Williams
*Assistant Examiner*—Richard A. Moller

[57] ABSTRACT

An optical transmission system comprises a plurality of mode-locked diode lasers each providing an output pulse at a different respective sub-carrier frequency. Means are provided for modulating each sub-carrier in response to respective input signals for providing a plurality of optical signals for transmission. A reference sub-carrier having a frequency such that the intervals between the reference sub-carrier frequency of each of the respective signal carrying sub-carrier channel frequencies is distinguishable from the intervals between respective signal carrying sub-carrier channels.

6 Claims, 6 Drawing Sheets

U.S. PATENT DOCUMENTS

| | | | |
|---|---|---|---|
| 4,635,246 | 1/1987 | Taylor et al. | 370/3 |
| 4,709,371 | 11/1987 | West | 372/44 |
| 4,734,910 | 3/1988 | Izadpanah | 372/18 |
| 4,768,852 | 9/1988 | Ih | 359/287 |
| 4,772,854 | 9/1988 | Silberberg | 372/21 |
| 4,807,227 | 2/1989 | Fujiwara et al. | 370/3 |
| 4,860,279 | 8/1989 | Falk et al. | 370/1 |
| 4,930,131 | 5/1990 | Sizer, II | 372/18 |
| 4,951,294 | 8/1990 | Basu et al. | 372/75 |
| 4,953,156 | 8/1990 | Olshansky et al. | 370/3 |
| 4,993,036 | 2/1991 | Ikeda et al. | 372/50 |
| 5,010,346 | 4/1991 | Hamilton et al. | 341/137 |
| 5,010,543 | 4/1991 | Hill | 370/3 |
| 5,020,049 | 5/1991 | Bodeep et al. | 359/124 |
| 5,109,447 | 4/1992 | Chan | 359/133 |
| 5,231,660 | 7/1993 | West, Jr. | 380/7 |
| 5,311,550 | 5/1994 | Fouche et al. | 375/260 |
| 5,347,525 | 9/1994 | Faris | 372/19 |

MODE-LOCKED DIODE LASER BASED OPTICAL COMMUNICATION SYSTEM

This is a continuation of application Ser. No. 07/947,122 filed on Sep. 17, 1992 now abandoned.

This invention relates to sub-carrier multiplexed optical communication systems. This invention also relates to the production of a short wavelength laser source through second harmonic generation (SHG).

Figure 6:
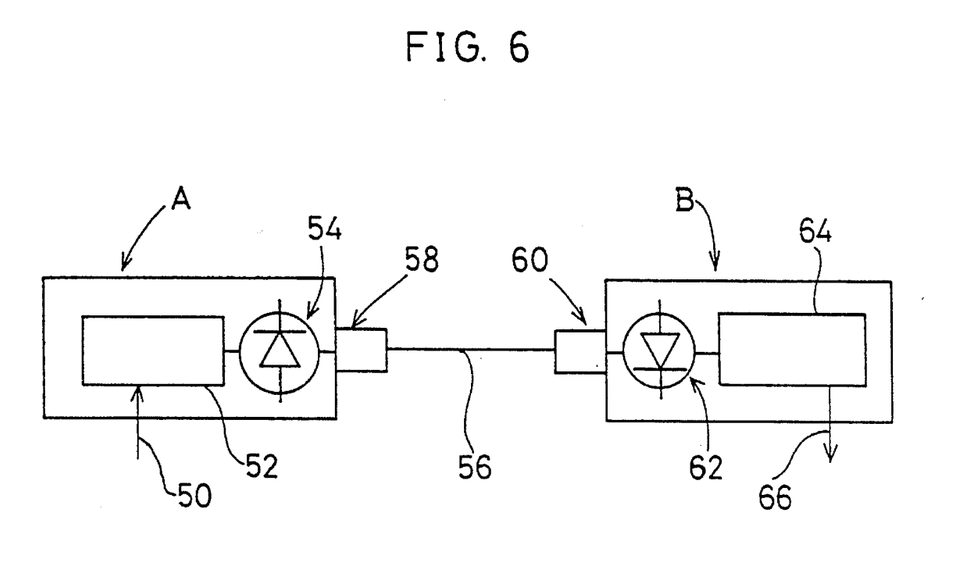
FIG. 6 is a schematic representation of a basic conventional optical communication system.

Optical communication systems are extensively used because of their comparatively wide bandwidth, small size and insensitivity to electrical interference. FIG. 6 illustrates in schematic form the basic components necessary for an optical communication system. The arrangement shown provides one-way data communication from a transmitter A to a receiver B. The transmitter A receives on input line 50 an electrical input signal carrying the information to be transmitted, and includes a suitable electrical driver circuit 52 for deriving from the input electrical signal, driver signals for driving a diode laser 54. The diode laser produces light which is modulated in accordance with the information, and which is coupled into one end of an optical fibre transmission line 56 through a first optical connector 58. The light travels along the transmission line 56 to the receiver B where it is applied, through a second optical connector 60, to a suitable photodetector 62 and thereby converted to an electrical signal. A receiver circuit 64 processes this signal and performs the required steps of demodulation etc to produce an output signal on output line 66 carrying the transmitted information in the required form. Although the bandwidths currently achievable in such systems are sufficient for voice transmission in telephone networks, and for data transmission, for example machine-to-machine communication in Local Area Netowrks (LANs), there is increasing interest in the potential of optical communication systems to integrate voice, data and video transmissions in local loop subscriber networks such as Broadband Integrated Services Digital Networks (B-ISDNs). To enable such systems to compete with conventional cable television transmission systems that have bandwidths of the order of GHz, it is desirable to provide bandwidths in excess of 10 GHz and preferably as high as 100 GHz.

Some proposed prior art optical transmission systems have utilised laser diodes operating in the small signal regime. In such systems the bandwidth is limited by the fall-off in the sub-carrier frequency response of the diode laser used to provide the More recently still, sub-carrier multiplexed optical transmission systems have been investigated and several systems proposed. Reference to such systems can be found in U.S. Pat. No. 4,953,156 and EP 0-359-205. In systems of these types, each signal to be transmitted is mixed with a microwave local oscillator, and then all of the microwave sub-carriers are electronically multiplexed with the others and used to drive a single monolithic diode laser in the small signal regime to provide a modulated optical signal. Although, with careful choice of the diode laser utilised, bandwidths of the order of 20 GHz can be achieved, the fall-off in the diode laser response still limits the bandwidths that are achievable. Cross-channel mixing can also cause problems.

Figure 1:
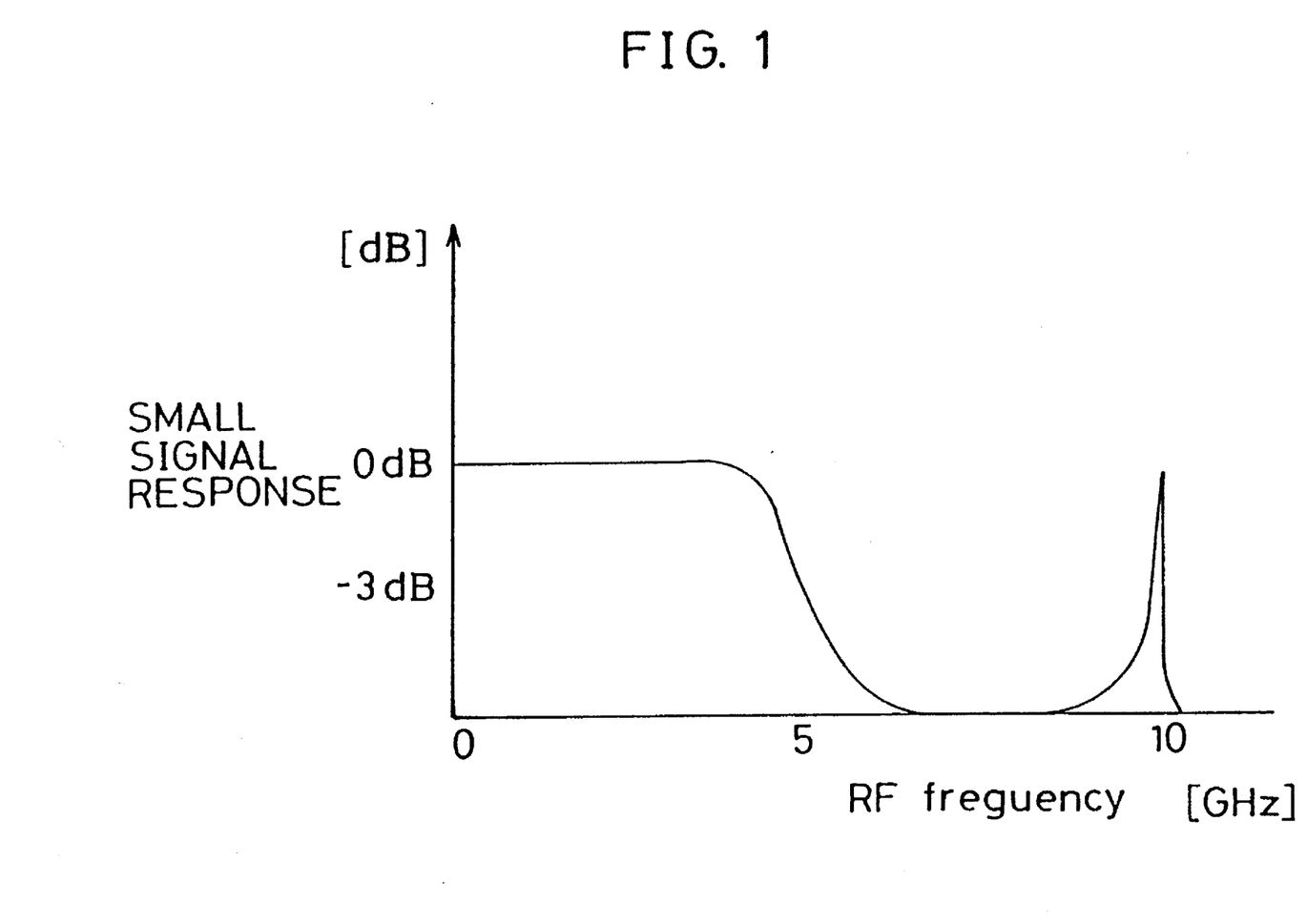
FIG. 1 is a representation the small signal response of a diode laser with a diode cavity length of around 4 mm.

It is known that, as well as the small signal frequency response of diode lasers, there is a resonance frequency that arises as a result of the dimensions of the diode cavity. This occurs at much higher frequencies. A diode laser operated so as to provide a pulsed beam at a resonance frequency of the diode cavity is known as a mode-locked diode laser. A mode-locked diode laser can be actively or passively FIG. 1 provides a schematic representation of the signal response of a diode laser of cavity length 4 mm. As can be seen the small signal response falls off at a few GHz. There is, however, a resonance peak at around 10 GHz. The frequency of the resonance peak is related to the round-trip distance of the laser cavity and is, accordingly dependent on the length of that cavity. By encouraging the laser to propagate at the optical resonance frequency, a high frequency sub-carrier is generated.

Figure 7:
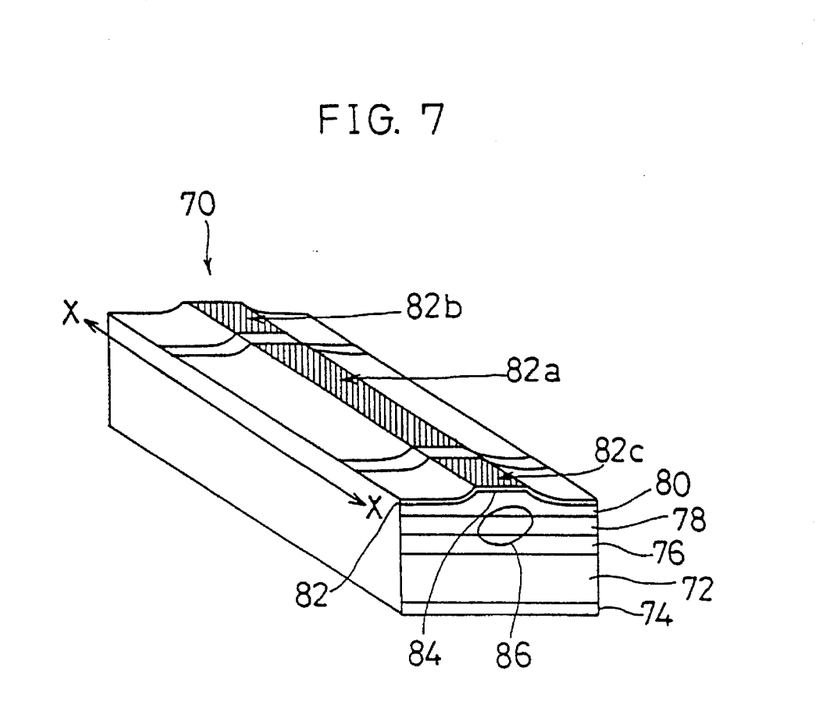
FIG. 7 is a perspective/sectional view of a known ridged, split contact Fabry-Perot diode laser.

Monolithic mode-locked diode lasers have been developed recently through the use of split-contact Fabry-Perot lasers allowing modulation at this optical resonance frequency. FIG. 7 illustrates in section and side perspective a typical construction of one material system for a double heterostructure quantum wall diode laser 70. A $n^+$-GaAs substrate 72 is formed on one side thereof with an n-ohmic contact 74. On the other side of the substrate is a laminated structure comprising, in order, a n-AlGaAs first cladding layer 76, a GaAs active layer 78 and a p-AlGaAs second cladding layer 80. Over the top of the second cladding layer is formed a p-ohmic contact 82.

As can be seen, the second cladding layer is formed with a longitudinal central ridge 84 which serves to localise the light generation to a central zone 86 in the active layer, and to encourage the light to propagate in the longitudinal direction X—X rather than to spread out in the whole of the plane of the active layer.

The p-ohmic contact of the illustrated laser diode 82 is split into a first, central portion 82a which defines a central gain region, a second portion 82b at one end which defines a RF modulation region, and third portion 82c at the other end which defines a saturable absorber region. In normal use of such a laser diode, a suitable dc bias is applied to the central contact portion 82a to cause laser light generation in the zone 86 of the central region, an RF pulsed signal is applied to the second contact portion 82b to pulse the laser at the desired sub-carrier frequency, and the signal to be modulated onto the sub-carrier is applied in the form of negative bias inhibiting pulses to the third contact portion 82c.

To actively mode-lock such a diode laser the radio frequency signal is applied at the optical resonance frequency of the diode laser cavity to the split contact portion 82c of the diode laser.

Passive mode-locking on the other hand is a technique which provides a pulsed output from the laser without application of such radio frequency input signal.

To produce an output pulse in passive mode-locking the energy band gap at the pn junction across the active layer is reduced in the saturable absorber region by the application of a reverse bias. By reducing the energy band gap, more energy levels are available to absorb photons generated in the gain region of the laser. At low light intensities upper state (conduction band) energy levels are not fully populated by excited electrons, and all the light is absorbed. At high intensities these upper state levels become fully populated and the absorption is saturated, i.e. further photons pass through the material without absorption until these upper states become depopulated. The mechanism for depopulation in these structure is dominated by drift in the reverse bias field to the contacts, and not by electron-hole recombination. The former process is characterised by the drift velocity $$v_d = \mu \epsilon$$

where $\epsilon$ is the field strength (Vcm$^{-1}$), and $\mu$ the mobility in cm$^2$/V.s. For reasonable bias voltages (eg 2V), and material thicknesses (across 2 μm) and using μ=8500 cm$^2$/V.s., for electrons in GaAs we get a value for $V_d$ of 8.5 10$^7$ cm/s. This is greater than the saturation velocity, which for this field strength is about 10$^7$ cm/s. Thus the corners are swept out of the 2 μm region within 10 ps. Therefore as long as the repetition rate of the mode locking pulses is less than 100 GHz the saturable absorber will recover. For optical guiding regions of 0.5 μm thickness (about the minimum to contain the mode), higher repetition rates are possible. There is, accordingly, a tendency for low intensity pulses to be absorbed while high intensity pulses, propagating at the resonance frequency of the diode laser cavity, are transmitted.

Because of absorbtion of low intensity pulses, a more stable output is achieved if a large reverse bias is provided at the saturable absorber. The greater the reverse bias, however, the more laser power is absorbed and the weaker the intensity of the pulse. There is accordingly a trade-off between intensity and stability in the prior art passively mode-locked diode lasers.

It is only recently that a stable output has been achieved in passively mode-locked monolithic diode lasers. A technique known as Collision Pulse Modulation (CPM) has been used. (see M.C. Wu et al, IEDM 1990 pp 137–139). In this technique the saturable absorber of a monolithic diode laser is placed in the middle of the diode cavity to improve pulse shaping when two counter propagating pulses are coincident in this region.

In a related field, there has been much research activity directed towards the production of a compact blue laser source. Such lasers are desirable for applications in data storage as shorter wavelength light tends to increase the storage density of optical discs. One approach attracting interest at the moment is the generation of a direct blue emitting laser diode. Some progress has been made but there are still many problems to solve before a robust room temperature device can be fabricated.

An alternative approach uses second harmonic generators to double the frequency of visible laser light generated by a GaAs/AlGaAs laser diode. Two of the approaches that have been tried are intra-cavity frequency doubling of a diode pumped Nd:YAG laser, and direct frequency doubling of a GaAlAs diode laser using a frequency stabilized external resonator. The first approach is, however, not particularly compact and the second requires sophisticated electronics for stabilisation.

It is an aim of the present invention to provide an optical transmission system that alleviates at least some of the problems of the aforementioned prior art. It is another, separate, aim of the present invention to provide a system for second harmonic generation.

In accordance with one aspect of the present invention there is provided an optical transmission system comprising a plurality of mode-locked diode lasers each adapted for generating a different respective sub-carrier frequency at an optical resonance frequency determined by dimensions of the respective diode laser cavities, and means for modulating each sub-carrier in response to a respective input signal for providing a plurality of optical signals for transmission.

To date, sub-carrier multiplexing for providing a large bandwidth for transmission of information has been accomplished by the modulation of microwave sub-carriers. The invention of the present application resides at least partially in the recognition that use can be made of the high frequency pulsed output beam of a mode-locked diode laser, as an optical sub-carrier channel. By using several sub-carriers of different frequencies, higher bandwidths can be achieved.

The sub-carriers channels can then be frequency or digitally modulated.

Preferably each of the plurality of the mode-locked diode lasers has a different respective diode cavity dimension to generate the respective sub-carrier frequencies.

Although either type of mode-locked diode laser (ie. active or passive) can be used to generate the plurality of sub-carrier frequencies for multiplexing, preferably each of the mode-locked diode lasers is a passively mode-locked monolithic diode laser. This reduces the electronics required for generation of the sub-carrier channels and may also provide sub-carriers of more precise frequency.

The sub-carrier channels generated can be analog or digital, frequency or amplitude modulated. To implement digital amplitude modulation, a large reverse bias introduced to the third contact is used selectively to suppress pulses produced by the laser so as to impose digital information onto the sub-carrier. Because of the time lag inherent in suppression of the pulse it is not likely to be possible to utilise the entire bandwidth of each sub-carrier for carrying digital data, although if thresholding detection is used, ie. the pulses are amplitude modulated below or above a certain threshold, the modulation bandwidth will probably be limited by the parasitics associated with the digital data connection. By providing several sub-carrier channels a high bandwidth digital signal is available for optical transmission. For analog amplitude modulation, a variable reverse bias can be applied to the third contact.

For frequency modulation, the spacing between adjacent sub-carrier channels is adequate to accommodate expected signal band-widths. The modulation of the sub-carrier can be effected by coupling the generated pulsed light beam to an optical modulator such as a lithium niobate crystal. Other frequency modulation techniques both analog and digital are, however, envisaged.

In one preferred embodiment local oscillators at receiving terminals of the system are employed to detect the information transmitted by one or more of the sub-carriers.

Because of the high frequencies possible with an optical transmission system in accordance with the first aspect of the present invention, it may be difficult to provide detector electronics capable of operating at the desired frequencies.

To deal with this problem a second aspect of the present invention provides an optical transmission system comprising means for generating a plurality of signal carrying sub-carrier channels at different respective frequencies each separated from the frequencies of all other said channels by respective predetermined intervals, and means for providing a reference sub-carrier having a frequency such that the intervals between the reference sub-carrier frequency and each of the respective signal carrying sub-carrier channel frequencies is distinguishable from each of said predetermined intervals.

Even when such a system is used in a high frequency regime (>few CHz), conventional consumer electronics can be used for the detector and the local oscillators. Although little, if any, mixing between the carriers occurs during transmission in the optical medium, each of the signal carrying sub-carriers mixes with the reference sub-carrier at a detector to provide a low frequency difference signal that can be detected and demodulated. The available bandwidth for transmission can therefore be increased while using existing demodulation electronics. This aspect of the invention provides a means by which the first aspect of the invention can be readily implemented although its use is not limited to operation with the optical transmission system of the first aspect of the invention. The detection of other high frequency optical and electrical systems could be handled in a similar manner. This system has the added advantage that change in frequency between the sub-carriers and the reference frequency due to drift is reduced. Accordingly the corresponding change in frequency of the low frequency local oscillator at the receiver is reduced.

The reference sub-carrier is preferably of much greater amplitude than the signal carrying sub-carriers in order for the difference signals carrying the signal information to be distinguishable from noise potentially generated at detectors as a result of interference between signal carrying sub-carriers.

The signal carrying sub-carriers are each preferably separated from sub-carriers of adjacent frequencies by a single predetermined interval. A said reference carrier separated from one of the signal carrying sub-carriers by an interval less than this predetermined interval will then have the required properties for mixing with each signal carrying sub-carrier channel to provide a signal carrying difference signal.

An optical transmission system of the second aspect of the present invention utilising a reference sub-carrier channel, would be particularly suited to systems for transmitting data over a small number of high bandwidth channels.

In accordance with a third aspect of this invention there is provided a passively mode-locked diode laser comprising a driver laser and a passively mode-locked slave laser, the driver laser being operable to provide a seed pulse at a frequency substantially equal to that of a resonance of the passively mode-locked slave laser, and means to deliver the seed pulse to the diode cavity of the slave laser, such that a pulse at the said resonance is generated in-phase with the seed pulse.

Such an arrangement utilises the seed pulse delivered to the diode cavity of the slave laser to encourage the generation of an output pulse in-phase with the output pulse of the driver laser. With a stable pulsed signal being introduced to the slave laser diode cavity, a stable pulsed output beam can be generated without the penalty of low intensity.

The slave laser is preferably a passively mode-locked monolithic laser diode. The driver laser is also preferably a passively mode-locked monolithic diode laser provided with saturable absorber region is preferably operable under a large reverse bias to generate a highly stable, but low intensity output pulse.

The slave laser is preferably provided with saturable absorber and gain region contacts. As the driver laser provides a stable seed pulse, the reverse bias on the saturable absorber need be only relatively low to generate the stable output pulse, and therefore the intensity of this pulse can be higher.

The slave laser is preferably provided with a third contact for providing a modulating signal to the pulsed output signal, although other means, separate from the slave diode laser, of introducing a signal to the pulsed output signal can be employed.

The master laser acts as an alternative to a semiconductor laser amplifier in these configurations, but with the advantage, especially over travelling wave amplifiers, (R<0.1%) and also over Fabry-Perot amplifiers (R<10%), that no coatings are required. Fabry-Perot amplifiers have to be tuned (e.g. by temperature) to resonance with the input wavelength and similar considerations apply to the master/slave configuration of this invention. This is because in the frequency domain the mode-locked pulses can consist of many Fabry-Perot cavity modes locked in phase. Because of the coupling of the cavities in the master/slave configuration, however, the resonance condition will be somewhat relaxed.

In accordance with a fourth aspect of the present invention there is provided a higher harmonic generator comprising a mode-locked diode laser for generating a high power pulsed beam at substantially the resonance frequency of its diode laser cavity, a non-linear medium, and means coupling the high powered pulsed beam to the non-linear medium for the generation of a higher harmonic of the pulsed beam.

The mode-locked diode laser is preferably a passively mode-locked diode laser as the blue laser source can then be compact as only a d.c. bias must be provided to the saturable absorber to generate the pulsed output. If, however, the mode-locked diode laser is an actively mode-locked diode laser, a stabilised r.f. signal must be provided to generate the pulsed output.

The pulsed output beam from a mode-locked diode laser, provides high intensity peaks. As the power of the peak of a signal generated through second harmonic generation is proportional to the square of the power of the peak of the fundamental, a very high power output beam of the second harmonic is generated using the second harmonic generator of this invention. The output beam from the second harmonic generator is pulsed but the frequency of the pulsation is relatively high and can be ignored for the purposes of data storage for which blue laser sources are used.

Although the master/slave arrangement of the third aspect of the present invention provides an ideal stabilized pulsed output beam for use in a second harmonic generator of the fourth aspect of the present invention, this is not the only passively mode-locked diode laser configuration that is suitable for use in this application. Any stable high power pulsed output beam from a passively mode-locked laser could be used.

The invention will now be described in greater detail, by way of example only with reference to FIGS. 1–8 of the drawings of which.

Figure 2:
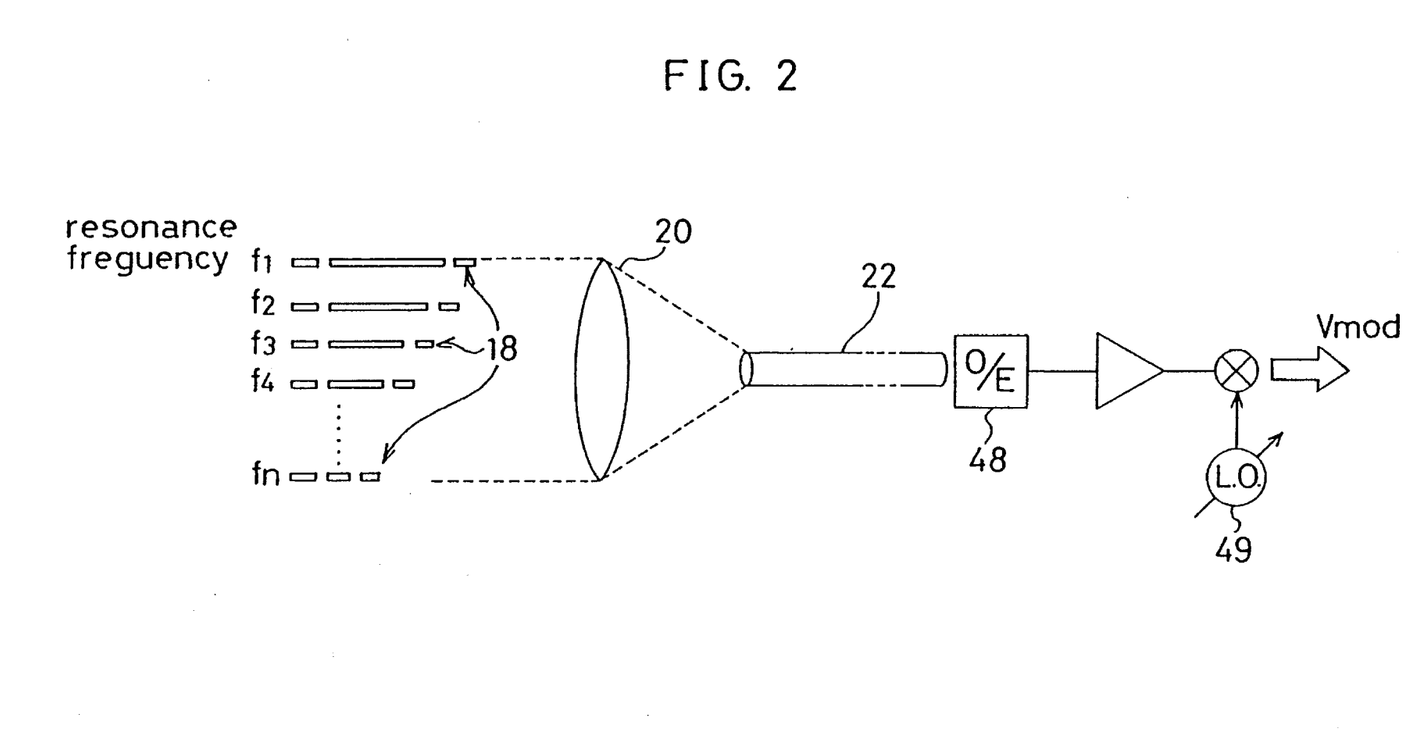
FIG. 2 is a schematic representation of electrical communication system of the present invention.

FIG. 2 is a schematic representation of an array of diode lasers 18, each with a different cavity length. Each laser diode therefore has a resonance peak at a respective different frequency ($f_1$ to $f_n$). By causing the laser diodes 18 to operate at their respective resonance frequencies, a plurality of sub-carriers are provided that can be used for the transmission of data signals.

The diode cavities of adjacent diode lasers of the array illustrated in FIG. 2 have lengths that increase by a common increment. The sub-carrier frequencies generated by the diode lasers are separated by a corresponding fixed amount.

By careful choice of the length increment, the frequencies of adjacent carriers can be separated by a frequency adequate to accommodate the expected signal bandwidths.

By way of example, sub-carriers having frequencies 9.8, 9.9, 10.0, 10.1, 10.2, . . . GHz may be utilised. Each sub-carrier can then carry a 50 MHz bandwidth signal. Because of the presence of higher harmonics, only one octave of sub-carriers can be utilised. However at frequencies around 10 GHz this is a considerable bandwidth. The sub-carrier channels are coupled through a suitable optical connector (illustrated as a converging lens 20) onto an optical fibre 22, which is preferably a single mode optical fibre to minimise dispersion. Other suitable ways of transmitting the optical signals could, however, be utilised, for example, multimode optical fibre could be used for short distance transmissions.

In the specific embodiment illustrated, passively mode-locked laser diodes are used to generate the sub-carriers. The present invention could, however, use actively mode-locked diode lasers to provide the respective sub-carriers. This would, however, require the use of a series of r.f. oscillators to actively generate the respective sub-carrier frequencies. This approach would require more implementing electronics than the preferred embodiment utilising passively mode-locked diode lasers.

Figure 3:
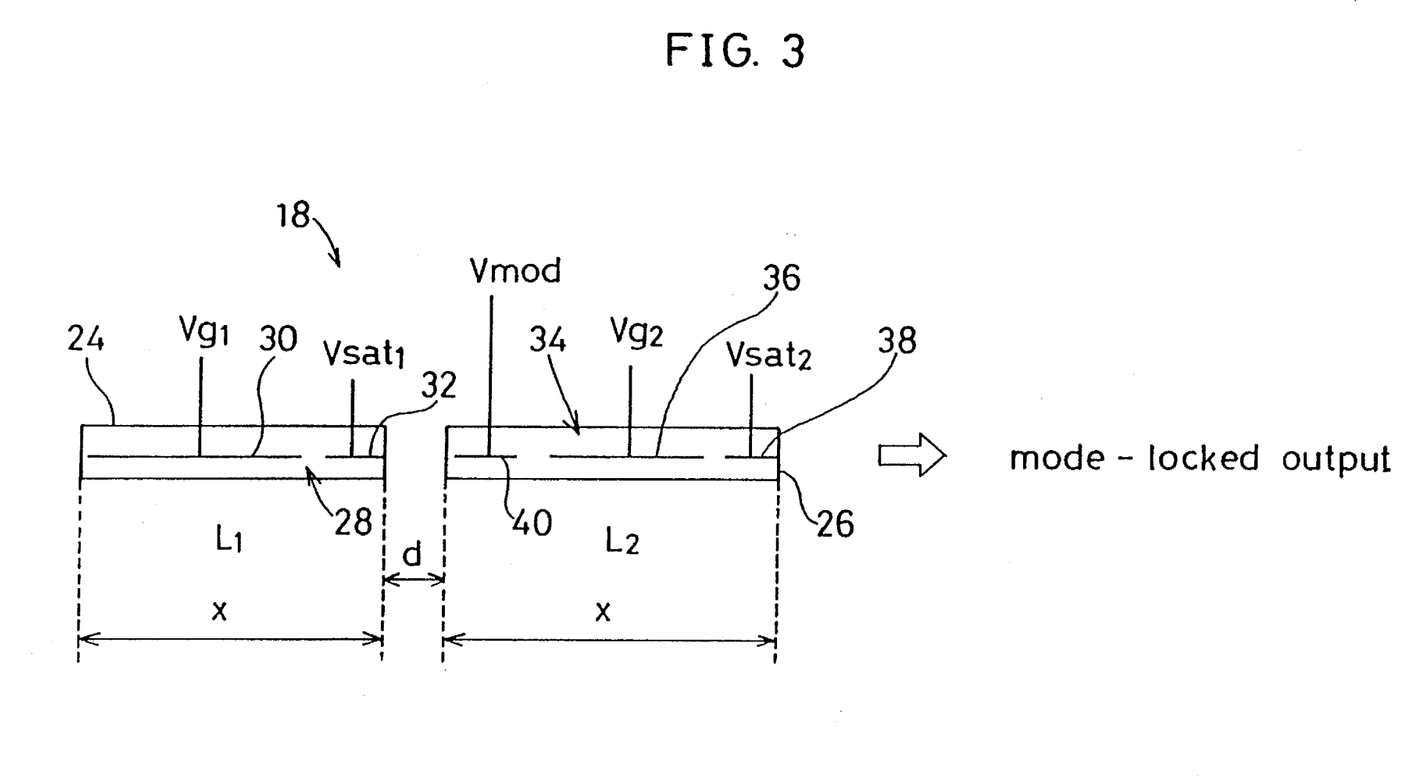
FIG. 3 is a schematic representation of a driver/slave laser diode arrangement for providing a passively mode locked output.

Colliding Pulse Mode-locking (CPM) techniques, can be utilised to provide a suitable array of mode-locked diode lasers. FIG. 3, however shows a driver/slave diode laser utilised in this embodiment to provide a stable pulsed output at the resonance frequency of the diode laser.

The passively mode-locked diode laser 18 is formed of a driver laser 24, and a slave laser 26. Both the driver and slave lasers 24, 26 have a cavity of length 'x' so that each has a resonance at the same frequency although differences in the length in the region of 1% can be tolerated. The driver laser 24 is monolithic and has a split contact 28, having a long, gain contact 30, and a short, saturable absorber contact 32. The gain contact 30 is held at a positive bias voltage $V_{g1}$. The saturable absorber contact 32 is provided with a large negative d.c. bias $V_{sat1}$ that encourages the absorbtion of low intensity laser pulses generated by the driver laser. The d.c. bias is set so as to provide sufficient absorbtion for a stable output pulse to be generated. The output pulse from the driver laser 24 is delivered to the diode cavity of the slave diode laser 26 separated from the driver laser 24 by a distance d.

The slave laser 26, is also provided with a split contact 34, but this time divided into three. A long gain contact 36, is provided with a positive bias. A short, saturable absorber contact 38, is provided with a small negative bias $V_{sat2}$, and the third contact 40 is supplied with a signal for modulating the sub-carrier generated, where $|V_{sat1}|>|V_{sat2}|$. This is possible as the seed pulse delivered to the slave laser is sufficient to ensure that the pulse that builds up in the slave laser 26 is in-phase with the seed pulse. There is no need therefore, to provide a large reverse bias to the contact 38 in order to provide a stable output. The gain region of the slave laser increases the intensity of the light pulse and consequently a high intensity stable output pulse is provided.

The modulating signal $V_{mod}$, applied to the third contact 40, can take the form of an analog or digital signal, so as selectively to suppress or reduce the amplitude of pulses by the introduction of a large negative bias. The inertia of the system means that a pulse cannot be turned off in a single cycle at 10 GHz. It is necessary, therefore, for a number of cycles, say ten, to be used to provide a single digital bit. Although this reduces the bandwidth available for transmission of data, the loss in bandwidth is compensated for in accordance with the present invention by a corresponding increase in the number of sub-carriers. However, if thresholding techniques are used at the receiver then digital bits are detected by the amplitude of the particular signal (ie. whether it is above or below the threshold). This can be done within a single cycle of the repetition rate.

The sub-carriers can also be analog or digitally frequency modulated. The information signal added to the sub-carrier frequencies then takes the form of a low frequency signal. The bandwidth of the information signal that can be carried by a sub-carrier is determined by the spacing between sub-carrier channels. In this particular system the sub-carrier channels are separated by 0.1 GHz and therefore analog signals of bandwidth up to 50 MHz can be carried.

The sub-carrier channels provided by respective driver/slave mode-locked monolithic laser diodes of the array can be modulated in either of the manners described to transmit a large bandwidth signal from a transmitter to one or more receiving stations. Sub-carriers modulated in both manners could be carried together on a single transmission line.

The cavity lengths of respective diodes of an array of passively mode-locked monolithic laser diodes for use in the present invention could be defined using in situ facet etching techniques. This technique would have to be practised with great accuracy to ensure that the driver 24 and slave 26 laser of each laser pair in the array are of substantially the same length i.e. within an error of 1%. The incremental length for providing lasers with adjacent frequency resonances should also be accurately defined to ensure regularly spaced sub-carrier channels. When utilising in situ facet etching, the laser mirrors formed at the opposite ends of the laser cavities arise from processing steps and not from cleaving.

Figure 4:
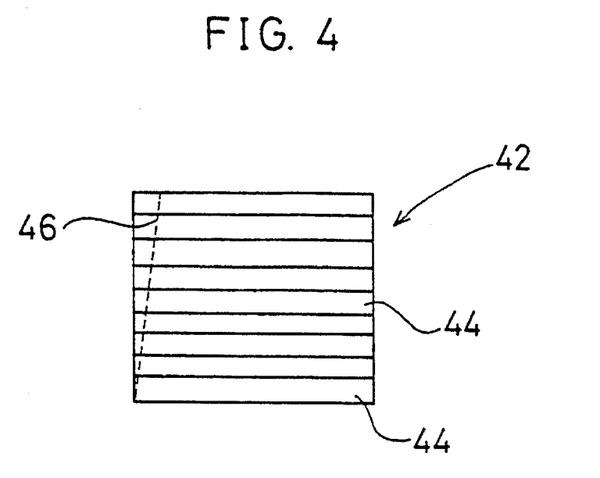
FIG. 4 is a schematic representation of cleaved wafer for providing an array of diode lasers having different diode cavity lengths.

An alternative technique for defining the laser cavity lengths involves cleaving an array of equal length diode lasers from a wafer. FIG. 4 schematically illustrates a cleaved wafer 42 on which is formed an array of separate lasers 44. A polishing technique is then used on the array to provide an angled (a few degrees) mirror facet along the broken line 46 simultaneously at one end of each cavity. This technique is particularly suitable for an array of CPM passively mode-locked laser diodes. A correspondingly angled facet would, however, have to be provided for the array of driver and the array of slave lasers in the preferred driver/slave mode-locked diode laser arrangement of FIG. 3. The difference in length of adjacent lasers and the corresponding resonance frequency difference would depend upon the angle of polish and the separation of the lasers in the array.

Either of the above techniques, or any other technique suitable, can accordingly be used to provide an array of passively mode-locked monolithic diodes of different cavity lengths for use in the present invention. However, in situ facet etching is probably the most practical for use with an array of driver/slave lasers.

Although high bandwidth optical transmission systems such as those of the present invention can be utilised in a number of different ways, one use of particular interest is in video subscriber systems. With the bandwidths of the order of 350 GHz possible with the present invention, thousands of video channels can be transmitted simultaneously to enable an end subscriber to receive any number of channels or perhaps to choose individual films out of thousands broadcast continuously.

With currently available techniques, laser diodes as small as 100 microns can be produced with accuracy. A diode cavity of this dimension has a resonance frequency of about 350 GHz. Such a bandwidth would enable thousands of television channels to be carried by a single optical fibre. The use of high frequency sub-carriers in itself generates problems in detection of transmitted signals as currently available detection electronics are only operable to frequencies of the order of 50 GHz. As previously discussed, electronics at these high frequencies are at the forefront of technology and are correspondingly expensive. It may, therefore, be desirable for the time being to provide sub-carriers of frequencies of around 10 GHz as this will provide ample bandwidth for around 10 GHz as this will provide ample bandwidth for most applications.

Figure 5:
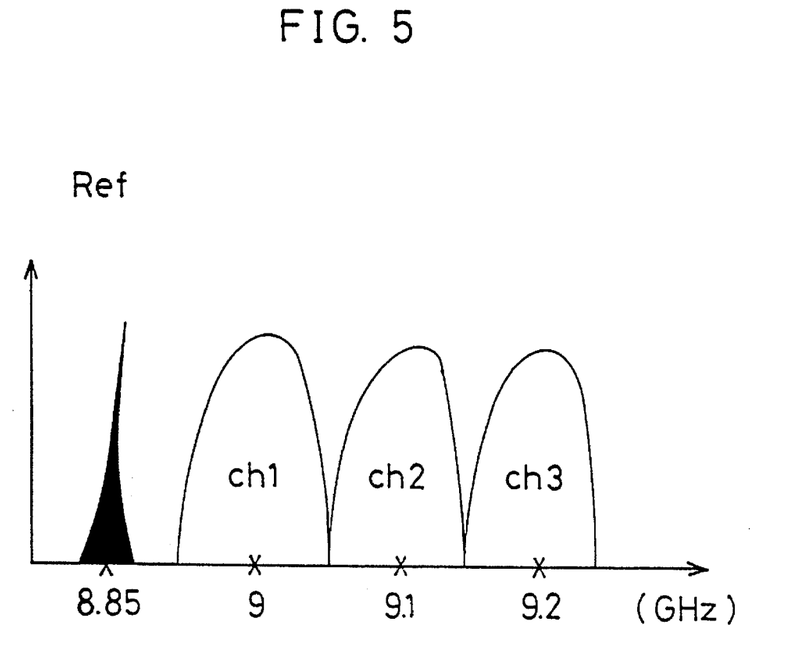
FIG. 5 is a graph showing the sub-carrier channels along with the reference frequency used to transmit data in accordance with this invention.

An alternative to limiting the bandwidth is to use a system illustrated in FIG. 5. This is a system that enables large bandwidth signals to be detected and demodulated using currently available consumer electronics. The sub-carrier channels shown in FIG. 5, have sub-carrier frequencies starting from 9 GHz and separated from adjacent channels by 0.1 GHz. Each channel is analog frequency modulated. In conventional systems, the signals would be detected at the sub-carrier frequency, and a local oscillator at the frequency of respective channels would then be employed to retrieve the carried signal. In accordance with this aspect of the invention, an intermediate frequency signal may be introduced to enable detection of a difference signal that is more easily transmitted to a demodulation site, thus avoiding the need for local oscillators having frequencies of around the transmission frequency.

In the system represented in FIG. 5 a reference sub-carrier Ref at 8.85 GHz is transmitted along with the signal carrying sub-carrier channels Ch1, Ch2, Ch3 etc. The reference sub-carrier carries no signal.

This reference signal will mix with the signal carrying sub-carriers at a detector 48 (FIG. 2) to provide difference signals with frequencies of 0.15, 0.25, 0.35, . . . GHz. Signals of these frequencies can easily be detected using conventional electronics. By making the reference signal of large amplitude relative to the sub-carriers, the difference signals are distinguishable from noise that may arise as a result of cross-channel mixing at the detector. Local oscillators 49 with frequencies of 0.15, 0.25, 0.35 . . . GHz can also then be used to retrieve the transmitted signal $V_{mod}$. Any relative drift between the signal and reference sub-carriers (which should be minimised due to the fact that they are generated on the same chip), will have to be compensated by a corresponding change in the low frequency level oscillators.

As well as being suitable for video subscriber systems, a system of this type would allow a single terminal to retrieve a wide bandwidth signal transmitted by an umber of channels as the electronics for detection of the signal on each channel would be relatively inexpensive. Such a system would also lend itself for use in local area computer networks where one or more terminals transmits modulated optical signals at one or more of the sub-carrier frequencies.

Another application to which a stable passively mode-locked diode laser of the type described above could be put is in second harmonic generation to produce a high intensity blue laser light source. Such high frequency laser beams are of particular interest in the field of data storage as they enable data to be stored on optical discs at a higher density. Although the master/slave laser of this invention would provide a particularly stable, high power output, other diode lasers providing a high intensity pulsed output could be utilised instead.

A passively mode-locked diode laser provides a series of output pulses each of high power. The frequency of the output light can be doubled and even higher harmonics generated by passing the pulsed output through a nonlinear bulk crystal or a waveguide second harmonic generating (SHG) crystal.

In such a conversion, the peak power of the second harmonic output beam is proportional to the square of the peak power of the fundamental i.e. the input beam. Therefore, by providing a high power fundamental from a stable passively mode-locked diode laser, the peak power of the generated second harmonic can be greatly increased.

As the output is pulsed, the average power of the generated second harmonic is related to the duration of the pulse within one repetition cycle. If the duration of the pulse in the fundamental is taken to be 1/N, the average power $P_{SMG(av)}$ of the second harmonic is related to the peak power $P_{f(av)}$ by the following relation;

$$P_{SHG(av)} \alpha P^2 f(av) \times N$$

That is, efficiency of the system is proportional to the peak power of the fundamental multiplied by the duty cycle (N).

$$\frac{P_{SHg(av)}}{P_{f(av)}} \alpha P_{f(av)} \times N$$

The efficiency of the doubling conversion accordingly varies directly with the duty cycle (N). By reducing the duration of the peaks, the conversion efficiency can be increased.

For a typical passively mode-locked diode laser the pulse duration is around 10 ps and the duty cycle varies from around 10 to around 100. The duty cycle of a passively mode-locked diode can be increased by the appropriate application of d.c. bias to the passively mode-locked diode laser to gain improvements in efficiency by a factor of at least 20. The efficiency of conversion can, accordingly, be improved over generation with continuous laser source by a factor N where N can be as great or even greater than 20.

Second harmonic generation can take place in a bulk crystal or in a waveguide SHG crystal. An improvement in efficiency of about a factor of 20 is possible with a waveguide SHG over use of a bulk crystal as a second harmonic generator. In one embodiment of the fourth aspect of the invention a waveguide SHG is used to generate the second harmonic.

Figure 8:
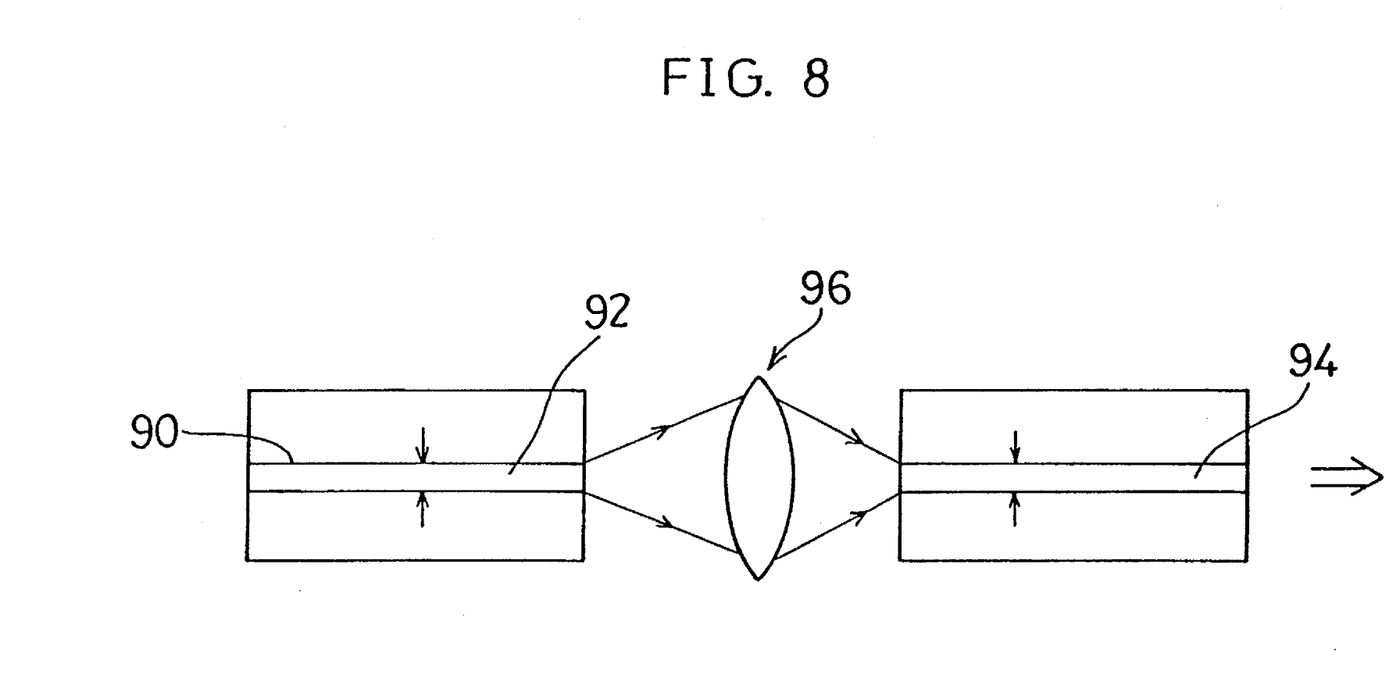
FIG. 8 is a section through a compact blue laser source of the fourth aspect of the present invention.

An example of such a system for generating blue laser light from a GaAs/AlGaAs laser is illustrated in FIG. 8. A passively mode-locked diode GaAs/AlGaAs laser 90 having a cavity length of 4 mm and laser strips 92 5 μm across produces a pulsed output beam at 860 nm. The contacts of the diode laser are similar to those illustrated in FIG. 7. Such a diode laser typically generates output pulses of 10 ps duration. A duty cycle of 10 can accordingly be readily produced. By appropriate application of d.c. bias duty cycles as high as N=20 and even higher can be achieved. The laser light at 860 nm generated by the diode laser 90 is coupled into a waveguide SHG 94 formed of $KNbO_3$ (Potassium Niobate) through a coupling lens 96. Other nonlinear materials could, however, be used instead of $KNbO_3$. One such suitable material is $LiNbO_3$. The waveguide SHG 94 is 5 mm long and has lateral dimensions of 4 μm×4 μm. The waveguide SHG 94 may be formed either by creating a higher index guiding region or a lower index cladding region. The arrangement described above generates an output from the waveguide SHG 94 at 430 nm. With existing nonlinear crystals conversion efficiencies of about 50% should be achievable.

The systems discussed above are just some of the many ways in which the various aspects of the present invention can be utilised. The provision of high bandwidth communication systems allows for greater versatility in information transfer. The high power stable passively mode-locked diode laser can be used in this and many other transmission systems. Finally the system of transmission of a reference sub-carrier along with signal carrying sub-carriers that allows conventional low frequency electronics to be utilised at detectors may have many uses in a number of high frequency communication systems.

I claim:

1. An optical communication system comprising means for generating a plurality of signal carrying sub-carrier channels on respective carriers, each sub-carrier channel being a different respective frequencies each separated from the frequencies of all other said channels by respective predetermined intervals, means for providing a reference sub-carrier on a respective carrier having an intermediate reference frequency such that intervals between the reference sub-carrier frequency and each of the respective signal carrying sub-carrier channel frequencies are distinguishable from each of the predetermined intervals, and means for mixing said reference sub-carrier with said signal carrying sub-carrier channels to provide difference signals.

2. An optical communication system according to claim 1, wherein the reference sub-carrier is of greater amplitude than the signal carrying sub-carrier channels so that said difference signals are distinguishable from any cross-channel noise.

3. An optical communication system according to claim 2, wherein the reference sub-carrier is a non-signal carrying sub-carrier.

4. An optical communication system according to claim 2, wherein the signal carrying sub-carriers are at frequencies of at least about 9 GHz.

5. An optical communication system according to claim 1, wherein each signal carrying sub-carrier is separated from sub-carriers of adjacent frequencies by a single predetermined interval.

6. An optical communication system according to claim 1, wherein the plurality of the signal carrying sub-carrier channels and the reference sub-carrier are each pulsed laser beams generated by a mode-locked diode laser.

* * * * *